United States Patent [19]

Casselbrant

[11] 4,112,162

[45] Sep. 5, 1978

[54] STRUCTURAL CHIPBOARD WOOD BEAM

[75] Inventor: Sven Gustav Casselbrant, Lidingö, Sweden

[73] Assignee: Svenska Utvecklingaktiebolatget, Stockholm, Sweden

[21] Appl. No.: 455,146

[22] Filed: Mar. 27, 1974

[51] Int. Cl.[2] .......... B32B 5/12

[52] U.S. Cl. .......... 428/106; 428/113; 428/114; 428/541

[58] Field of Search .......... 161/162, 168, 402; 428/44, 106, 113, 114, 323, 326, 357, 541

[56] References Cited

U.S. PATENT DOCUMENTS

| | | | |
|---|---|---|---|
| 2,642,371 | 6/1953 | Fahrni | 161/162 X |
| 2,686,143 | 8/1954 | Fahrni | 161/162 X |
| 2,847,733 | 8/1958 | Roy | 161/162 X |
| 2,960,423 | 11/1960 | Kreibaum | 161/168 X |
| 3,164,511 | 1/1965 | Elmendorf | 161/168 X |
| 3,447,996 | 6/1969 | Himmelheber et al. | 161/162 X |
| 3,956,555 | 5/1976 | McKean | 428/106 |

*Primary Examiner*—George F. Lesmes

*Assistant Examiner*—Henry F. Epstein

*Attorney, Agent, or Firm*—Flynn & Frishauf

[57] ABSTRACT

A chipboard beam made of glue coated chips has top and bottom layers extending for the full length of the beam consisting of elongated chips, that may be for example as much as 5cm in length oriented with their fibers in the longitudinal direction of the beam. The middle layer is made of flat chips having random fiber orientations in a vertical plane parallel to the long dimension of the beam. The chips are glued together under heat and pressure in a press, with the result that there is great coherence both between and within the layers. The pressing is done with the wider cross-sectional dimension of the beam horizontal, so that at this stage the layers of chips are side-by-side longitudinal stringers. In order to provide higher density in the outer layers (top and bottom layers in the load bearing position of the beam) after a preliminary pressing of the bed downwards against the support of the bed, a lateral pressing of the edges with higher pressure is performed which provides increasing density of the edges which become the top and bottom of the beam.

7 Claims, 4 Drawing Figures

STRUCTURAL CHIPBOARD WOOD BEAM

This invention relates to a wooden beam built up of wood chips glued together under pressure.

Structural beams are usually made of concrete or steel, particularly if large dimensions are required for the bearing of heavy loads. Beams made of lumber with cross-sectional dimensions that exceed the usual round wood dimensions must be glued together out of a large number of boards according to a definite pattern. This process is relatively labor-intensive, as a result of which the beams so produced are expensive. A principal object of the present invention is the production of wooden beams in the desired dimensions and with great load carrying capacity, with very low requirement of manual labor and at low cost.

Another object of the invention is the production of wooden beams from wood which in the round state is not suitable for cutting up into conventional lumber.

SUBJECT MATTER OF THE PRESENT INVENTION

Briefly, wood chips are arranged before pressing so that in the finished beam in its load carrying position, there are several superposed layers in each of which the chips are predominantly oriented in a particular manner, so that they are glued together under pressure to form a beam with layers of good coherence. More particularly, there are at least three layers of wood chips in the above-described arrangement, each layer extending over the full length of the beam. The two outer layers, which in load carrying position are the upper and lower layers respectively, consist predominantly of chips having their fibers oriented principally in the longitudinal direction of the beam, while the middle layer consists predominantly of chips having their fibers lying substantially in a longitudinal vertical plane (again assuming the beam to be in load carrying position).

One method of making such a beam is to arrange the chips in a bed made up of laterally adjacent stringers of chips disposed in the longitudinal direction and consisting alternately (that is, the stringers alternating in chip orientation) of chips having their fibers mainly in the longitudinal direction of the stringer and of chips having their fibers substantially in a plane parallel to the supporting surface for the chip bed, preferably directed at random in such a plane.

The glue-coated chips are introduced into a heated press in the form of an elongated bed. In this condition they are compressed downwardly against the supporting surface, preferably with the edges of the bed restrained so that a rectangular beam is formed. In a preferred form, the bed is first compressed in a direction perpendicular to the supporting surface and then is compressed between the edges, that is, in a direction parallel to the supporting surface transverse of the longitudinal direction, at a higher pressure than the maximum pressure of the previous step.

The invention is further described by way of example with reference to the accompanying drawings, in which.

Figure 1:
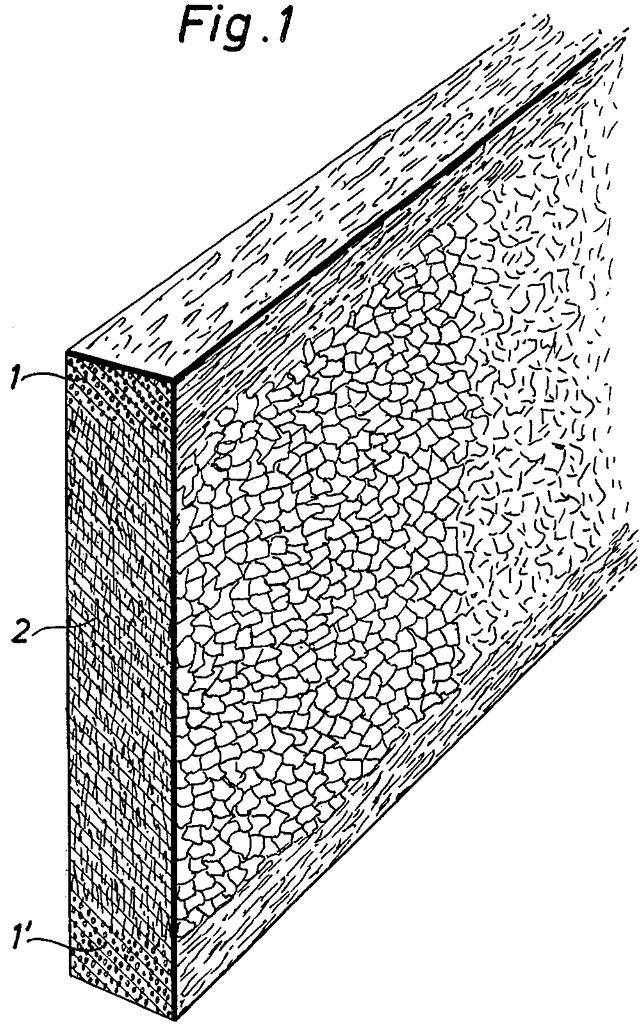
FIG. 1 is a perspective view of a structural beam according to the invention.

The beam shown in FIG. 1 is built up of three layers extending over the entire length of the beam. In the top and bottom layers 1 and 1' respectively, which may be regarded as the outer layers compared to the middle layer 2, the wood chips that make up the beam are oriented substantially in the longitudinal direction of the beam, which means that the fibers in these chips are also oriented mainly in the longitudinal direction of the beam. The middle layer 2 between the top and bottom layers just described contains thin flat chips of relatively large dimensions in length and width. The chips are in principle arranged in a lengthwise vertical plane of the beam, so that the fibers in these chips are principally oriented in a vertical plane of the beam. The last-mentioned chip orientation in the plane, however, is fully at random therein, as a result of which these fibers are at various angles to each other.

A beam produced in this form has the property of being able to carry large loads, because stress both in compression and in tension is effectively taken up by the wood fibers oriented in the longitudinal direction of the beam disposed in the outer layers, that is, the top and bottom layers of the beam. The middle layer takes up the strain of shear forces, among others, and at the same time provides an effective connection between the two outer layers. The middle layer 2 can usually be made of lower density than the outer layers 1 and 1' respectively. Since the amount of chips actually necessary in the middle layer can be quite small, it is possible to reduce the volume of this layer, with care not to go below a certain minimum density, so that it forms a web between the upper and lower layers. Preferably the outer layers 1 and 1' are made with a density that increases towards the outer surface.

As illustrated in FIG. 1, the chips used in the structural beam are, for the best results, larger than those used in conventional chip board. They may, for example, have a thickness of about 0.8 mm and a maximum length of about 50 mm. When smaller chips are used, there arise difficulties in obtaining the orientation of such chips in the desired directions.

In the beam above described the chips used in the outer layers 1 and 1' have an elongated form. These may also have a relatively large spread in cross-section provided that the chips are so oriented that their fibers are principally directed in the longitudinal direction of the beam. The chips used in the layer 2, aligned in a vertical plane of the beam, but still turned at random in that plane, may also be replaced by elongated chips such as those used in the outer layers. In that case even these are to be oriented in a vertical plane of the beam either in random orientation in the plane or else in two principal directions preferably forming a right angle to each other, or at an angle of about 45° to the vertical dimension of the beam.

Structural beams in accordance with the invention can be produced by introducing a bed of chips built up of glue coated chips, oriented in the desired direction, into a heated press in which the chip bed is heated and then compressed by the application of pressure. A few examples for types of presses that may be used are described below with reference to FIGS. 2, 3 and 4.

Figure 2:
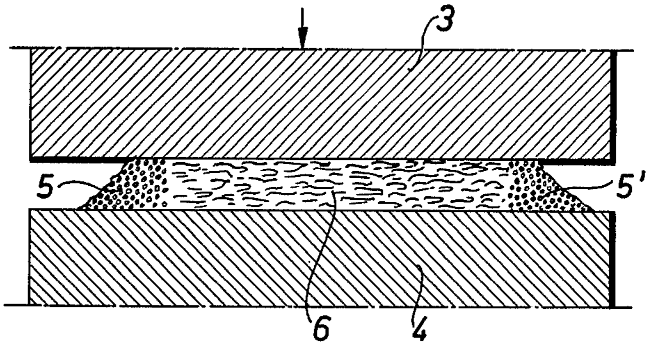
FIGS. 2,3 and 4 are diagrammatic cross-sections through different illustrative types of presses that may be used for the production of beams in accordance with the invention.

FIG. 2 shows diagrammatically, in cross-section, a conventional press with upper and lower press plates 3 and 4 respectively, having plane pressing surfaces between which a chip bed is introduced. The chip bed consists of two outer chip stringers 5 and 5' respectively, consisting of elongated chips oriented and disposed longitudinally in the aforesaid stringers, and between these two stringers a somewhat broader stringer 6 containing flat chips disposed parallel to the press surfaces (i.e. in horizontal planes, but turned at random in the horizontal plane).

The coating of the chips with glue and the introduction of the chip bed into the press can be carried out in accordance with known processes for making chip board.

A press of the kind shown in FIG. 2 has the advantage that it can be used for pressing beams of different heights. Furthermore, it can be used for simultaneous pressing of two or more parallel beams, in which case the chip bed is built up of at least 5 stringers that respectively contain, in alternation from one stringer to the next adjacent stringer, chips oriented longitudinally of the beam and chips oriented in planes parallel to the press surfaces. The term "stringer" means an elongated straight body with similar structure along its length and particularly a body which forms part or is adjacent to another body of somewhat similar composition. The term implies some coherence as well as continuity of structure. In the present case the term is used for the different layers of chips as they are in the bed before the bed is pressed and glued together under pressure to form the beam.

In the example just mentioned of a chip bed made up of 5 longitudinal stringers of alternating characteristics pressed into one unit, the block so pressed is sawed longitudinally down the middle, the cut going through the middle layer, which is in this case, like the outer layers, made up of elongated chips oriented in the longitudinal direction of the block.

With the kind of press shown in FIG. 2, moreover, it is not possible to produce beams in which the outer layer has an increasing density as the outer edge surface is reached. The outer edges of the block pressed in this type of press must, on the contrary, be trimmed after pressing.

Figure 3:
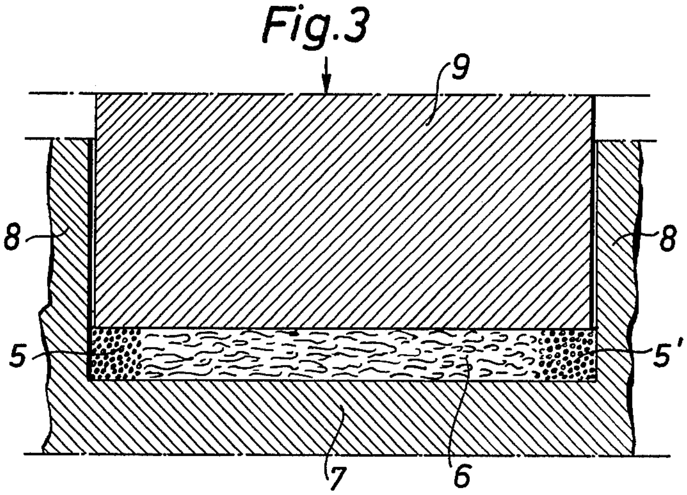

In the press shown in FIG. 3 the lower press surface 7 is provided with longitudinal sides 8 between which the upper press block 9 fits with very little play. This design enables beams with plane top and bottom surfaces to be produced in the press. On the other hand, this press, like the one already described, does not permit the provision of an appreciable density gradient in the outer layers. Furthermore, this type of press cannot readily be used for the production of beams of different height.

Figure 4:
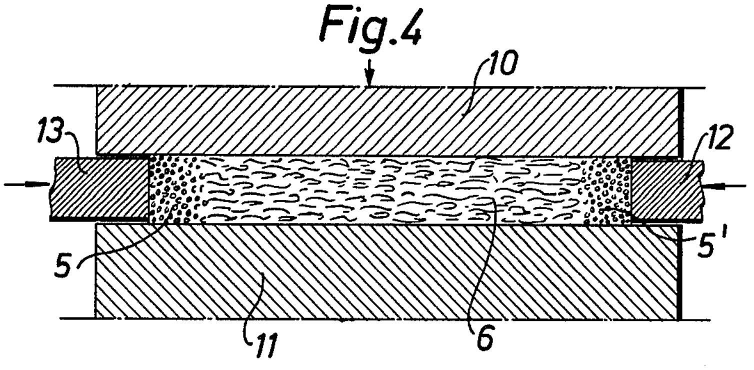

FIG. 4 shows a press that has, in addition to upper and lower press plates or blocks 10 and 11, also has edge pressing members 12 and 13 respectively. The chip bed should be introduced in the press in such a way that the middle stringer reaches a greater height than the outer stringers. In compression the upper press plate is first lowered down to a position determined by the edge pressing members, during which operation only the middle stringer is mainly affected and compressed to the desired density. Thereafter, the edge press members are actuated, which, by applying a significantly higher pressure than that of the horizontal press plates, compress the outer layers of the chip bed in a lateral direction. Since the last-mentioned pressing of the chips does not significantly affect the middle layer, it is possible to obtain distinctly higher desity in the outer layers than in the middle layer in this manner and, furthermore, such higher density is one that increases towards the outer surface of the outer layer. A beam produced with the press of FIG. 4, in addition to having the desired increase of density in the outer layers, exhibits very strong cohesion between the layers.

In all of these and other presses, the lower press plate, the upper press plate, or both, may be profiled rather than flat in order to produce beams having varying thickness over their height. Some density differences can also be obtained by variation of the density of the chip bed.

The presses above described and the methods mentioned in connection with them for the manufacture of a structural beam in accordance with the invention are given only as examples, which can be varied in many respects. The presses used can consist either of fixed presses or they can be constituted as continuous presses, i.e. presses from which a continuous compressed product is obtained (extruded). Furthermore, the shape and size of the chips can be varied over a wide range provided that they can be oriented in the desired way.

The term "a vertical longitudinal plane of the beam" is sometimes used for short to mean a vertical plane parallel to the long dimension of the beam, which is vertical when the beam is placed in load bearing position (i.e. with its wider faces vertical).

I claim:

1. A structural beam of compressed glued wood chips comprising three layers (1, 1′, 2) of said chips, each of said layers extending over the entire length of the beam, said layers being stacked in the direction of the wider and normally vertical cross-sectional dimension of the beam, the outer and normally upper and lower layers (1, 1′) consisting predominantly of chips having a shape elongated in the principal direction of orientation of their respective fibers, said chips of said outer layers (1, 1′) being oriented in said layers with their long dimension substantially in the longitudinal direction of the beam and the middle layer (2) consisting predominantly of flat chips having their fibers oriented substantially in normally vertical planes, which planes are parallel to the longitudinal direction of the beam and within which planes the fibers of the chips are randomly oriented.

2. A structural beam as defined in claim 1 in which the chips forming said middle layer (2) are predominantly flat chips of a shape elongated in the principal direction of orientation of their respective fibers.

3. A structural beam as defined in claim 1 in which said middle layer (2) is of lower density than said outer layers (1, 1′).

4. A structural beam as defined in claim 1 in which said outer layers (1, 1′) have a density that increases in going from their respective boundary surfaces with said middle layer (2) to their opposite outer surfaces.

5. A structural beam of compressed glued wood chips comprising three layers (1, 1′, 2) of said chips, each of said layers extending over the entire length of the beam, said layers being stacked in the direction of the wider and normally vertical cross-sectional dimension of the beam, the outer and normally upper and lower layers (1, 1′) consisting predominantly of chips of a shape elongated in the principal direction of their respective fibers, said chips of said outer layers being oriented with their long dimension substantially in the longitudinal dimension of the beam, and the middle layer (2) consisting predominantly of flat chips of a shape elongated in the principal direction of thier respective fibers and having their fibers oriented in substantially vertical planes, which planes are parallel to the longitudinal direction of the beam and within which planes the fibers of the chips are oriented principally in two oblique directions, each at substantially 45° both to said longitudinal direction and to said normally vertical cross-sectional dimension of the beam.

6. A structural beam as defined in claim 5 in which said middle layer (2) is of lower density than said outer layers (1, 1').

7. A structural beam as defined in claim 5 in which said outer layers (1, 1') have a density that increases in going from their respective boundary surfaces with said middle layer (2) to their opposite outer surfaces.

* * * * *